United States Patent [19]
Horiba et al.

[11] Patent Number: 5,537,390
[45] Date of Patent: Jul. 16, 1996

[54] DEVICE FOR DETECTING RESIDUAL CAPACITY OF SECONDARY BATTERY

[75] Inventors: Tatsuo Horiba; Kyoko Ikawa, both of Hitachi; Mamoru Mizumoto, Katsuta, all of Japan

[73] Assignee: Hitachi, Ltd., Tokyo, Japan

[21] Appl. No.: 111,307

[22] Filed: Aug. 24, 1993

[30] Foreign Application Priority Data

Aug. 27, 1992 [JP] Japan ................................. 4-250372

[51] Int. Cl.$^6$ ............................................. H01M 10/48
[52] U.S. Cl. ................................. 320/3; 320/15; 320/48
[58] Field of Search ............................ 320/6, 3, 15, 39, 320/43, 44, 48

[56] References Cited

U.S. PATENT DOCUMENTS

| | | | |
|---|---|---|---|
| 4,066,936 | 1/1978 | Hirota | 320/3 X |
| 4,497,881 | 2/1985 | Bertolino . | |
| 4,851,756 | 7/1989 | Schaller et al. | 320/3 |
| 4,952,862 | 8/1990 | Biagetti et al. | 320/48 |
| 5,175,531 | 12/1992 | Whitmire et al. | 320/48 X |

OTHER PUBLICATIONS

"Report for Searching and Studying Capacity Meter for Residual Capacity for Electric Car," pp. 8 and 19, 1988, edited by Japan Electric Car Society Foundation.

Patent Abstracts of Japan, vol. 16, No. 574 (E–1298), Dec. 14, 1992, & JP–A–4–223065 K. Hironaka, et al., Aug. 12, 1992.

W. Schleuter in etz Archiv, vol. 4, (1982), No. 3, pp. 91–98.

Primary Examiner—Peter S. Wong
Assistant Examiner—Edward Tso
Attorney, Agent, or Firm—Antonelli, Terry, Stout & Kraus

[57] ABSTRACT

A secondary battery control device includes a secondary battery section, a current converting section for converting current inputted or outputted to the secondary battery section from direct current to alternating current or vice versa, and a charge and discharge control section for controlling an input and an output as monitoring the state of the secondary battery section. The secondary battery control device is characterized in that the secondary battery section is arranged to have a main battery, an auxiliary battery connected in parallel to the main battery, an operating section for operating a residual capacity of the main battery by detecting a voltage of the auxiliary battery, and an indicator for indicating the residual capacity outputted from the operating section.

20 Claims, 2 Drawing Sheets

DEVICE FOR DETECTING RESIDUAL CAPACITY OF SECONDARY BATTERY

BACKGROUND OF THE INVENTION

The present invention relates to a device for detecting a residual capacity of a secondary battery and a device for controlling a secondary battery.

A secondary battery is widely used as an electric energy source for an electric car or cordless equipment such as OA equipment, AV equipment, electric power tools, toys and communication equipment. As the secondary battery is more widely used, the solution for various technical problems about the secondary battery has been more strongly requested. Of these technical problems, it is likely that the technique for detecting and indicating a residual capacity in the battery is considered as a relatively slight problem by the manufacturers. However, this technique is a significant problem for the users. This is because the accurate grasp of an available time of the equipment makes it possible to use such equipment more conveniently and favorably. In particular, this problem is quite significant to an electric car.

A currently proposed system for detecting and indicating a residual capacity of a battery mainly uses a capacity meter for detecting a battery voltage, an open-circuit voltage, a discharge quantity, and a relative density of electrolytic solution ("Report for Searching and Studying Capacity Meter for Residual Capacity for Electric Car", pages 8 and 19, 1988, edited by Japan Electric Car Society Foundation).

The U.S. Pat. No. 4,952,862 discloses a device for estimating a battery residual capacity by deriving a battery discharge adaptive condition from a battery temperature, a battery voltage and an I/O current. As another prior art, the U.S. Pat. No. 4,497,881 discloses an indicator for a residual capacity which is arranged to observe a color of a compound in the battery through a battery window for detecting a residual capacity of the battery.

The aforementioned systems arranged to use a capacity meter for detecting a residual capacity of a battery has been theretofore proposed. These systems, however, have their inherent problems. Hence, they are not practically usable. The system for detecting a battery voltage has some problems. First, the battery voltage changes according to the quantity of discharge current of the battery. Second, the voltage in an open-circuit state is greatly different from the voltage in a closed-circuit state. Third, the system for detecting battery voltage is difficult to apply to a battery having excellent discharge voltage flatness. The system for detecting a voltage in an open-circuit state uses such a characteristic of a lead-acid battery as changing an open-circuit voltage of a lead-acid battery according to the discharge amount. However, the system for detecting a voltage in an open-circuit state is not applied to a battery having excellent discharge voltage flatness such as a nickel-cadmium battery, a nickel-hydrogen battery, a nickel-metal hydride, a nickel-zinc battery, and a zinc-air battery. Further, the change of a voltage when a closed circuit is exchanged to an open circuit depends on the quantity of discharge current in an open circuit. This dependency may give rise to an inaccurate measured value when the battery is in use.

The system for detecting a quantity of discharge current is not arranged to consider adverse effects such as self-discharge, a discharge temperature, and regenerative charge. As another problem, the reference discharge capacity of a battery is reduced as the charge and discharge cycle of the battery is progressing. The system for detecting a relative density of electrolytic solution is based on such a characteristic of a lead-acid battery as reducing a sulfuric acid concentration in electrolytic solution in the lead-acid battery and uses a relative density meter, for example, for detecting the sulfuric acid concentration. This system, therefore, may not apply to a sealed lead-acid battery having no free electrolytic solution or any other battery except the lead-acid battery.

SUMMARY OF THE INVENTION

It is an object of the present invention to provide a device for controlling a secondary battery and a device for detecting a residual capacity which are capable of solving the problems of the foregoing prior arts.

According to a first aspect of the invention, a device for controlling a secondary battery is characterized to include a secondary battery section, a current converting section for converting current inputted to or outputted from the secondary battery section from direct current to alternate current or vice versa, and a charge and discharge control section for controlling an input and an output as monitoring the state of the secondary battery section, the secondary battery section having a main battery, an auxiliary battery connected in parallel to the main battery, an operating section for deriving a residual capacity of the main battery by detecting the voltage of the auxiliary battery, and an indicating section for indicating the residual capacity outputted from the operating section.

According to a second aspect of the invention, a device for controlling a secondary battery is characterized to include a secondary battery section, a current converting section for converting current inputted to or outputted from the secondary battery section from direct current to alternate current or vice versa, and a charge and discharge control section for controlling an input and an output as monitoring the state of the secondary battery section, the secondary battery section having a main battery, an auxiliary battery connected in parallel to the main battery, an operating section for operating a residual capacity of the main battery by detecting a concentration of electrolytic solution in the auxiliary battery, and an indicating section for indicating the residual capacity outputted from the operating section.

According to a third aspect of the invention, a device for detecting a residual capacity is characterized to include a main battery, an auxiliary battery connected in parallel to the main battery and arranged to reduce a battery voltage linearly according to reduction of a residual capacity, an operating section for operating a residual capacity of the main battery by detecting a voltage of the auxiliary battery, and an indicating section for indicating the residual capacity outputted from the operating section.

According to a fourth aspect of the invention, a device for detecting a residual capacity is characterized to include a main battery, an auxiliary battery connected in parallel to the main battery and arranged to reduce a concentration of electrolytic solution linearly according to reduction of a residual capacity, an operating section for operating a residual capacity of the main battery by detecting a concentration of electrolytic solution of the auxiliary battery, and an indicating section for indicating the residual capacity outputted from the operating section.

As noted above, the present invention provides that the auxiliary battery serves as a secondary battery for detecting a residual capacity in addition to the main battery for the purpose of taking responsibility for electric energy for the device to control the secondary battery. In this case, the auxiliary battery is required to easily detect the residual capacity. Hence, the type of a battery is quite important for selecting the auxiliary battery. Moreover, the auxiliary battery is also required to have a self-discharge characteristic and a temperature characteristic which is relatively analogous to those of the main battery. To reflect these characteristics on the auxiliary battery, it is preferable to locate the auxiliary battery nearby the main battery. The auxiliary battery is a battery for detecting a residual capacity of the main battery and is intended to monitor the main battery. The capacity of the auxiliary battery may be far smaller than, concretely, about a third to a tenth that of the main battery. The selection of such a small auxiliary battery allows the increase of a weight and a volume to be suppressed.

In particular, the auxiliary battery having the same voltage as the main battery is connected in parallel to the main battery so that the auxiliary battery may be charged and discharged in parallel to the main battery. The auxiliary battery has to operate in a shallower depth of charge and discharge than the main battery. The depth of charge and discharge means a ratio of a capacity of a battery to a charge quantity or a discharge quantity, which is normally denoted by per cent. The small capacity of the auxiliary battery inevitably results in increasing the internal resistance of the battery, thereby limiting the quantity of current flowing through the auxiliary battery. Hence, the load put on the auxiliary battery is made smaller so that the device enables easy detection of the voltage close to the open-circuit voltage. Further, since the charge and discharge of the auxiliary battery is shallow, the degradation of the auxiliary battery is suppressed. To sufficiently limit the quantity of current flowing through the auxiliary battery, it is possible to connect a resistor with a proper magnitude of resistance in series to the auxiliary battery. In order to solve the difference between a real capacity and a display capacity of a battery when it is used for a long time, a refresh function may be provided for separately discharging the main battery and the auxiliary battery for the purpose of matching the quantity of the charges to each other on the level. This refresh function serves to prevent the lowering of measuring accuracy with time.

When the secondary battery is not charged or discharged, it is necessary to prevent forming of a loop of the parallel circuit and the degrade of the battery based on the loop formation, by separating the parallel circuit of the main battery and the auxiliary battery with a switch. As a system for detecting a residual capacity, the easiest way of detection is to measure a voltage. In addition, it is possible to use another way of measuring a relative density of electrolytic solution.

The same device as above may be arranged on that the auxiliary battery has a lower voltage than the main battery. This device may offer the same effect. In this arrangement, since the main battery has a higher voltage than the auxiliary battery, it is necessary to connect a resistor with a proper magnitude of resistance in series to the auxiliary battery for limiting the flow of current from the main battery to the auxiliary battery. Further, when the main battery is not charged or discharged, by separating the parallel circuit of the main battery and the auxiliary battery, it is necessary to prevent forming of a loop of the parallel circuit and degrading of the main battery and the auxiliary battery based on the formation of the parallel circuit loop. By considering the aforementioned respects, the auxiliary battery may properly operate at a smaller capacity and voltage than the main battery.

One way of using the secondary battery is a floating charge method. This is a method for charging and discharging at the same time. This method is used for an uninterruptible power supply, for example. Further, a regenerative charge used for an electric car is considered as a technique close to this method. This invention is intended to apply to a normal charge and discharge type battery. It may apply to the floating charge method or the electric car.

The main battery suited to the invention is a battery having excellent discharge voltage flatness such as a nickel-cadmium battery, a nickel-hydrogen battery, a nickel-metal hydride battery, a nickel-zinc battery, and a zinc-air battery. The auxiliary battery may be defined on a system for detecting a residual capacity. If the detecting system is for measuring a voltage, the battery having an inferior flat characteristic of a discharge voltage such as a lead-acid battery or a lithium battery may be suitable to the auxiliary battery. If the system is for measuring a relative density of electrolytic solution, a lead-acid battery may be suitable to the auxiliary battery.

According to the present invention, the auxiliary battery is connected in parallel to the main battery for detecting a residual capacity of the main battery, which residual capacity, otherwise, is quite difficult to detect, because the discharge voltage flatness is excellent. The use of the auxiliary battery for detecting a residual capacity of the main battery is based on such a characteristic of the auxiliary battery as reducing the battery voltage linearly according to the reduction of the residual capacity, in other words, on the inferior discharge voltage flatness. The auxiliary battery is located near the main battery by considering change of the residual capacity according to a discharge condition or a standing condition.

The main battery and the auxiliary battery may be made up of two or more units. If the main battery is different from the auxiliary battery in a battery type or voltage level, the total voltage of the main batteries connected in series may be made substantially equal to the total voltage of the auxiliary batteries connected in series.

The voltage flat characteristic may be represented quantitatively. Consider that a battery is kept discharged at ten hour discharge rate at a temperature of 20° C. If the voltage drop is 6% or less of an open-circuit voltage between 20% to 80% of a discharge capacity, it is defined as superior discharge voltage flatness. If it is more than 6%, it is defined as inferior discharge voltage flatness.

DESCRIPTION OF THE PREFERRED EMBODIMENTS

Figure 1:
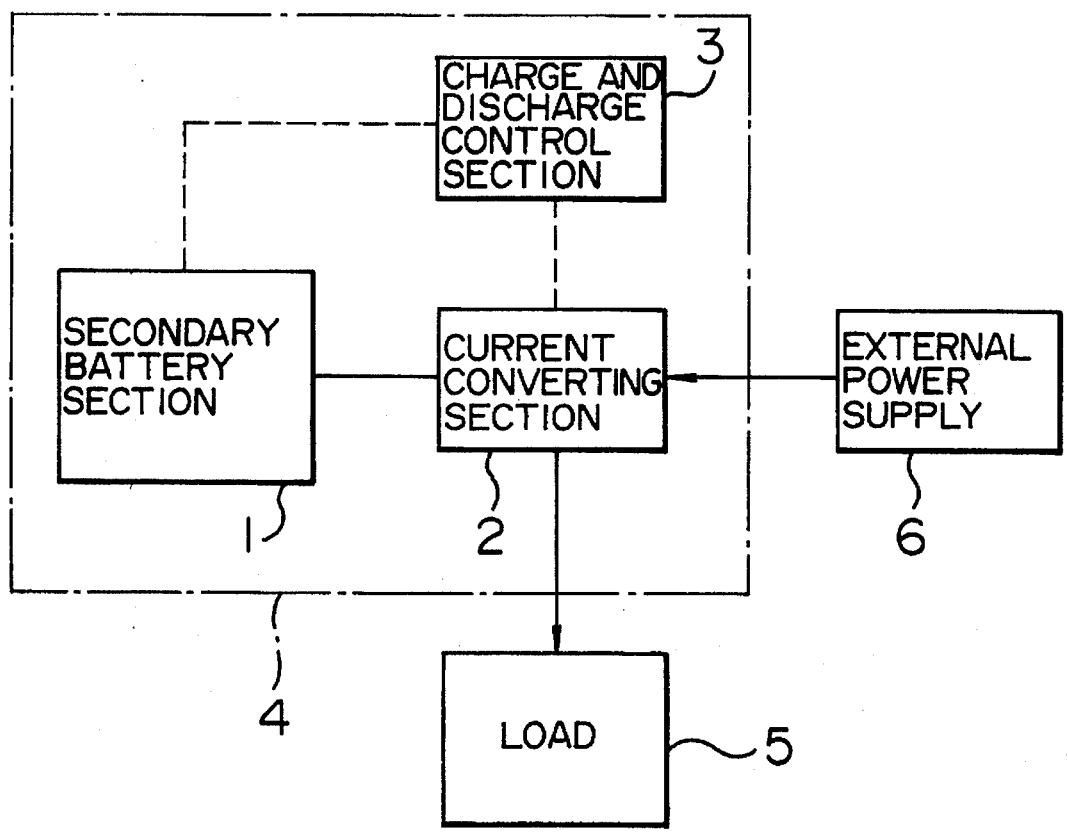
FIG. 1 is a block diagram showing an arrangement of a secondary battery unit according to an embodiment of the present invention.
Figure 2:
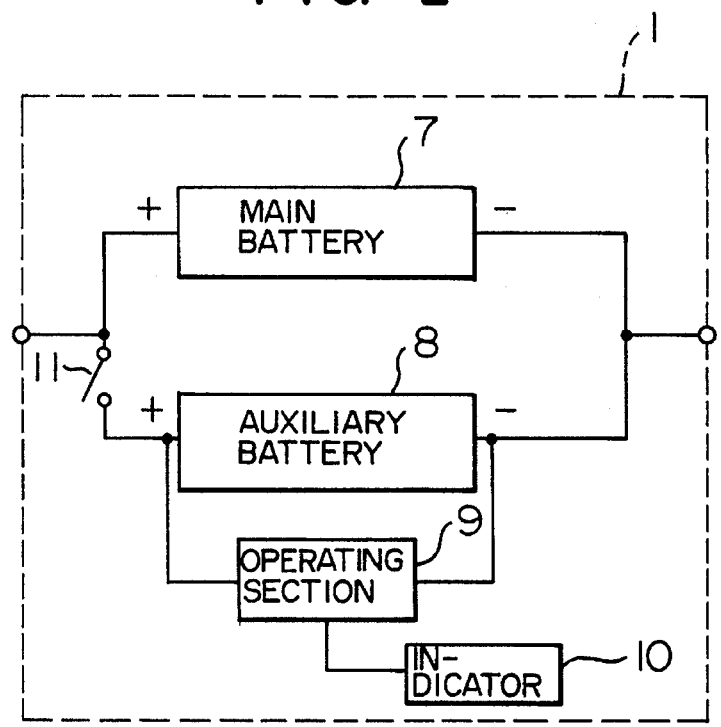
FIG. 2 is a block diagram showing an arrangement of a meter for a residual capacity of the battery unit shown in FIG. 1.
Figure 3:
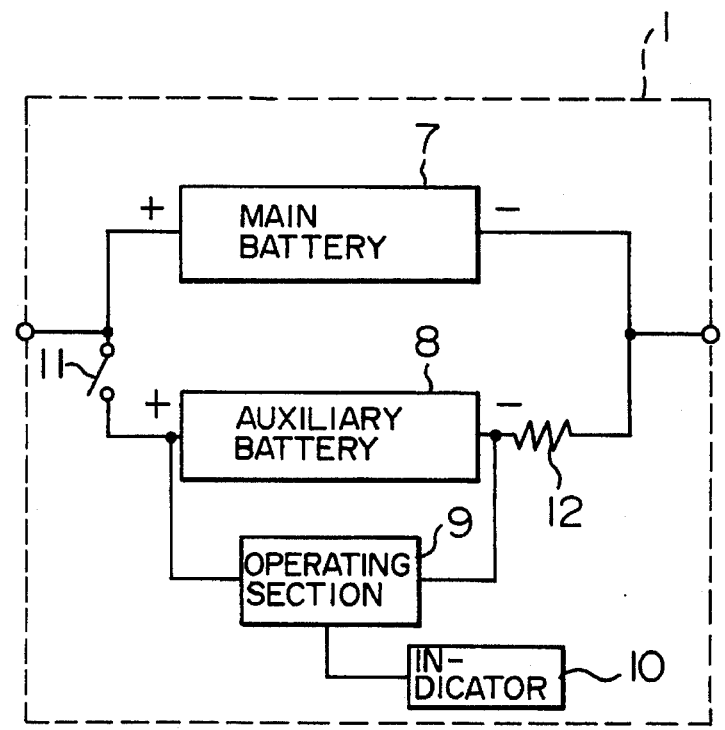
FIG. 3 is a block diagram showing an arrangement of a transformation of the meter shown in FIG. 2.

In FIG. 1, a numeral 1 denotes a secondary battery section. A numeral 2 denotes a current converting section for converting current to be inputted or outputted from direct current to alternating current or vice versa. A numeral 3 denotes a charge and discharge control section for controlling an input and an output by monitoring the state of the secondary battery section. A numeral 4 denotes a secondary battery device according to the present invention. A numeral 5 denotes a load applied on the secondary battery device 4. A numeral 6 denotes an ac or dc external power supply. FIG. 2 shows the secondary battery section 1 shown in FIG. 1 in more detail. As shown in FIG. 2, a numeral 7 denotes a main battery. A numeral 8 denotes an auxiliary battery for detecting a residual capacity of the main battery 7. A numeral 9 denotes an operating section for operating a residual capacity based on the information detected by the auxiliary battery. A numeral 10 denotes an indicator for analogously or digitally indicating the residual capacity derived by the operating section 9. A numeral 11 denotes a switch for separating a parallel circuit composed of the main battery 7 and the auxiliary battery 8 for preventing degrading of the battery, for example, when no load is applied to the main battery 7, and charge and discharge are not taken. FIG. 3 shows a transformation of FIG. 2, the different respect of which is that a balance resistor 12 is added to the auxiliary battery circuit. The balance resistor 12 operates to determine how much of the current is branched into the main battery circuit or the auxiliary battery circuit.

This balance resistor 12 is provided for restricting the quantity of current flown into the auxiliary battery circuit. Though the auxiliary battery has a larger internal resistance since it has a far smaller capacitance than the main battery, this balance resistor 12 further operates to restrict the quantity of inflow current for completely preventing overcharge and overdischarge.

The charge and discharge control section 3 serves to control an input and an output by monitoring the state of the secondary battery section. Concretely, the control section 3 serves to control to terminate the charging operation when the charge to the main battery 7 of the secondary battery section 1 is full or when the temperature of the main battery abnormally goes up, to gradually perform the charging operation when the temperature of the main battery is quite low, or separate the load when the capacity of the main battery is made smaller than the predetermined capacity.

Then, the detailed description will be oriented to how the operating section 9 operates.

For the system of detecting a voltage, a correlation formula is preset to the operating section 9. The correlation formula indicates a relation between a voltage of the auxiliary battery and a residual capacity of the main battery. By substituting the detected voltage of the auxiliary battery for the correlation formula, the residual capacity can be derived.

For the system of detecting a concentration of electrolytic solution, another correlation formula is preset to the operating section 9. The correlation formula indicates a relation between a concentration of electrolytic solution of the auxiliary battery and a residual capacity of the main battery. By substituting the detected concentration of electrolytic solution of the auxiliary battery for the correlation formula, the residual capacity can be derived. In addition, the operating section 9 may be composed of a semiconductor memory device.

Embodiment 1

A 6-V main battery pack is connected in parallel to a 6-V auxiliary battery pack. The main battery pack includes five nickel-cadmium batteries connected in series, each of which has a rated capacity of 1200 mAh. The auxiliary battery pack includes three film pack type small sealed lead batteries connected in series, each of which has a rated capacity of 200 mAh. The operating section has a preset correlation formula indicating a relation between a voltage of the sealed lead-acid battery and a residual capacity of the auxiliary battery. By measuring the change of a voltage of the auxiliary battery, the residual capacity can be derived. At some stages when the battery pack is charged or discharged, the residual capacity is measured and calculated from the voltage of the auxiliary battery. At a time, while the battery is being discharged at a rate of 0.2 CmA, each actual residual capacity is measured in the stages. The results are listed in Table 1.

TABLE 1

| Case | Estimated Residual Capacity (mAh) | Measured Residual Capacity (mAh) | Notes |
|---|---|---|---|
| 1 | 250 | 273 | |
| 2 | 600 | 628 | |
| 3 | 900 | 939 | |
| 4 | 1200 | 1141 | |
| 5 | 1050 | 1004 | After leaving the battery packs at room temperature for two weeks |

Table 1 indicates a good correspondence between the derived values and the measured values. It means that the present invention offers an effective technique.

Embodiment 2

A 7.2-V main battery pack is connected in parallel to an auxiliary battery pack. The main battery pack includes six nickel-metal hydride batteries connected in series, each of which has a rated capacity of 1700 mAh. The auxiliary battery pack includes two small lithium-carbon/cobalt dioxide batteries connected in series, each of which has a rated capacity of 400 mAh. The operating section has a preset correlation formula indicating a relation between a voltage and a residual capacity of the lithium-carbon/cobalt dioxide battery. By measuring the change of a voltage of the auxiliary battery, the residual capacity can be derived. At some stages when the battery pack is charged or discharged, the residual capacity can be measured on the voltage of the auxiliary battery. At a time, while the battery is being discharged at a rate of 0.2 CmA, the actual residual capacity is measured at the stages. The results are listed in Table 2.

TABLE 2

| Case | Estimated Residual Capacity (mAh) | Measured Residual Capacity (mAh) | Notes |
|---|---|---|---|
| 1 | 350 | 322 | |
| 2 | 850 | 897 | |
| 3 | 1100 | 1026 | |
| 4 | 1700 | 1730 | |
| 5 | 1200 | 1148 | After leaving the battery packs at room temperature for four weeks |

Table 2 indicates a good correspondence between the derived values and the measured values. It means that this embodiment offers an effective technique like the embodiment 1.

The present invention, therefore, makes it possible to implement a capacity meter for quite accurately detecting a residual capacity of the battery. This invention can make great contribution to improving convenience and way of use of any instrument having a secondary battery built therein.

What is claimed is:

1. A secondary battery control device comprising a secondary battery section, a current converting section for converting one of current inputted and current outputted to said secondary battery section from one of direct current to alternating current and alternating current to direct current, and a charge and discharge control section for controlling an input and an output by monitoring the state of said secondary battery section, said secondary battery section including a main battery, an auxiliary battery connected in parallel to said main battery, an operating section for determining residual capacity of said main battery by detecting the voltage of said auxiliary battery, and an indicator for indicating the determined residual capacity.

2. A secondary battery control device as claimed in claim 1, wherein said main battery has excellent discharge voltage flatness and said auxiliary battery has linearly reduced battery voltage based on reduction of residual capacity of said auxiliary battery.

3. A secondary battery control device as claimed in claim 1, wherein the capacity of said auxiliary battery is about 1/3 to 1/10 as large as that of said main battery.

4. A secondary battery control device as claimed in claim 1, wherein said main battery is composed of at least two battery units connected in series and said auxiliary battery is composed of at least two battery units connected in series.

5. A secondary battery control device comprising a secondary battery section, a current converting section for converting one of current inputted and current outputted to said secondary battery section from one of direct current to alternating current and alternating current to direct current, and a charge and discharge control section for controlling an input and an output by monitoring the state of said secondary battery section, said secondary battery section including a main battery, an auxiliary battery connected in parallel to said main battery, an operating section for determining residual capacity of said main battery by detecting the concentration of electrolytic solution of said auxiliary battery, and an indicator for indicating the determined residual capacity.

6. A secondary battery control device as claimed in claim 5, wherein said main battery has excellent discharge voltage flatness and said auxiliary battery has linearly reduced concentration of electrolytic solution based on reduction of residual capacity of said auxiliary battery.

7. A secondary battery control device as claimed in claim 5, wherein the capacity of said auxiliary battery is about 1/3 to 1/10 as large as that of said main battery.

8. A secondary battery control device as claimed in claim 5, wherein said main battery is composed of at least two battery units connected in series and said auxiliary battery is composed of at least two battery units connected in series.

9. A detector for detecting residual capacity of a battery, said detector comprising a main battery, an auxiliary battery connected in parallel to said main battery, an operating section for determining residual capacity of said main battery by detecting the voltage of said auxiliary battery, and an indicator for indicating the determined residual capacity.

10. A detector for detecting residual capacity as claimed in claim 9, wherein said main battery has excellent discharge voltage flatness and said auxiliary battery has linearly reduced voltage based on reduction of residual capacity of said auxiliary battery.

11. A detector for detecting residual capacity as claimed in claim 9, wherein the capacity of said auxiliary battery is about 1/3 to 1/10 as large as that of said main battery.

12. A detector for detecting residual capacity as claimed in claim 9, wherein said main battery is composed of at least two battery units connected in series and said auxiliary battery is composed of at least two battery units connected in series.

13. A detector for detecting residual capacity of a battery, said detector comprising a main battery, an auxiliary battery connected in parallel to said main battery, an operating section for determining residual capacity of said main battery by detecting the concentration of electrolytic solution of said auxiliary battery, and an indicator for indicating the determined residual capacity.

14. A detector for detecting residual capacity as claimed in claim 13, wherein said main battery has excellent discharge voltage flatness and said auxiliary battery has linearly reduced concentration of electrolytic solution based on reduction of residual capacity of said auxiliary battery.

15. A detector for detecting residual capacity as claimed in claim 13, wherein the capacity of said auxiliary battery is about 1/3 to 1/10 as large as that of said main battery.

16. A detector for detecting residual capacity as claimed in claim 13, wherein said main battery is composed of at least two battery units connected in series and said auxiliary battery is composed of at least two battery units connected in series.

17. A secondary battery control device comprising a secondary battery section, a current converting section for converting one of current inputted and current outputted to said secondary battery section from one of direct current to alternating current and alternating current to direct current, and a charge and discharge control section for controlling an input and an output by monitoring the state of said secondary battery section, said secondary battery section including a main battery having excellent discharge voltage flatness, an auxiliary battery connected in parallel to said main battery and having linearly reduced battery voltage based on reduction of residual capacity of said auxiliary battery, an operating section for determining residual capacity of said main battery by detecting the voltage of said auxiliary battery, and an indicator for indicating the determined residual capacity.

18. A secondary battery control device comprising a secondary battery section, a current converting section for converting one of current inputted and current outputted to said secondary battery section from one of direct current to alternating current and alternating current to direct current, and a charge and discharge control section for controlling an input and output by monitoring the state of said secondary battery section, said secondary battery section including a main battery having excellent discharge voltage flatness, an auxiliary battery connected in parallel to said main battery and having linearly reduced concentration of electrolytic solution based on reduction of residual capacity of said auxiliary battery, an operating section for determining residual capacity of said main battery by detecting the concentration of electrolytic solution of said auxiliary battery, and an indicator for indicating the determined residual capacity outputted from said operating section.

19. A detector for detecting residual capacity of a battery, said detector comprising a main battery having excellent discharge voltage flatness, an auxiliary battery connected in parallel to said main battery and having linearly reduced battery voltage based on reduction of residual capacity of said auxiliary battery, an operating section for determining residual capacity of said main battery by detecting the voltage of said auxiliary battery, and an indicator for indicating the determined residual capacity.

20. A detector for detecting residual capacity of a battery, said detector comprising a main battery having excellent discharge voltage flatness, an auxiliary battery connected in parallel to said main battery and having linearly reduced concentration of electrolytic solution based on reduction of residual capacity of said auxiliary battery, an operating section for determining residual capacity of said main battery by detecting the concentration of electrolytic solution of said auxiliary battery, and an indicator for indicating the determined residual capacity.

* * * * *